May 14, 1940.　　　　J. A. PERRY　　　　2,200,676
DUSTING DEVICE
Filed Jan. 12, 1939
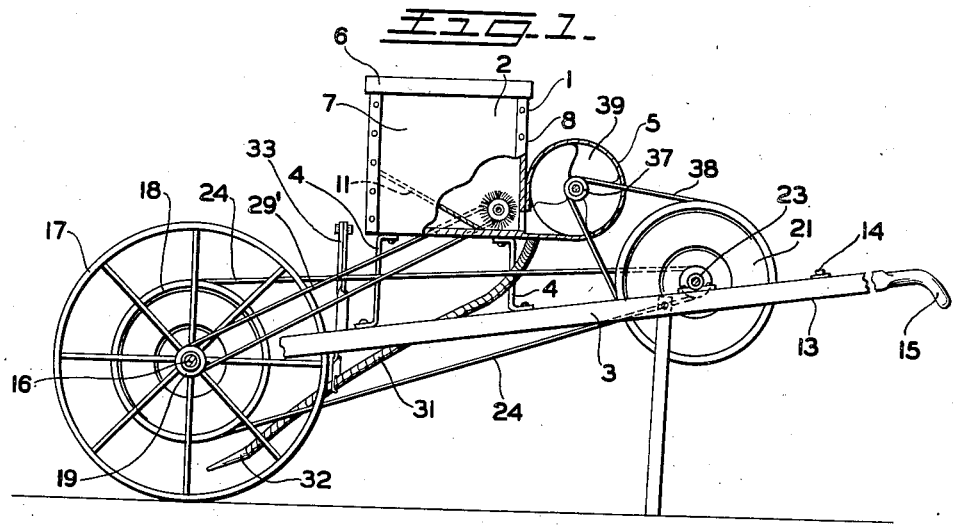
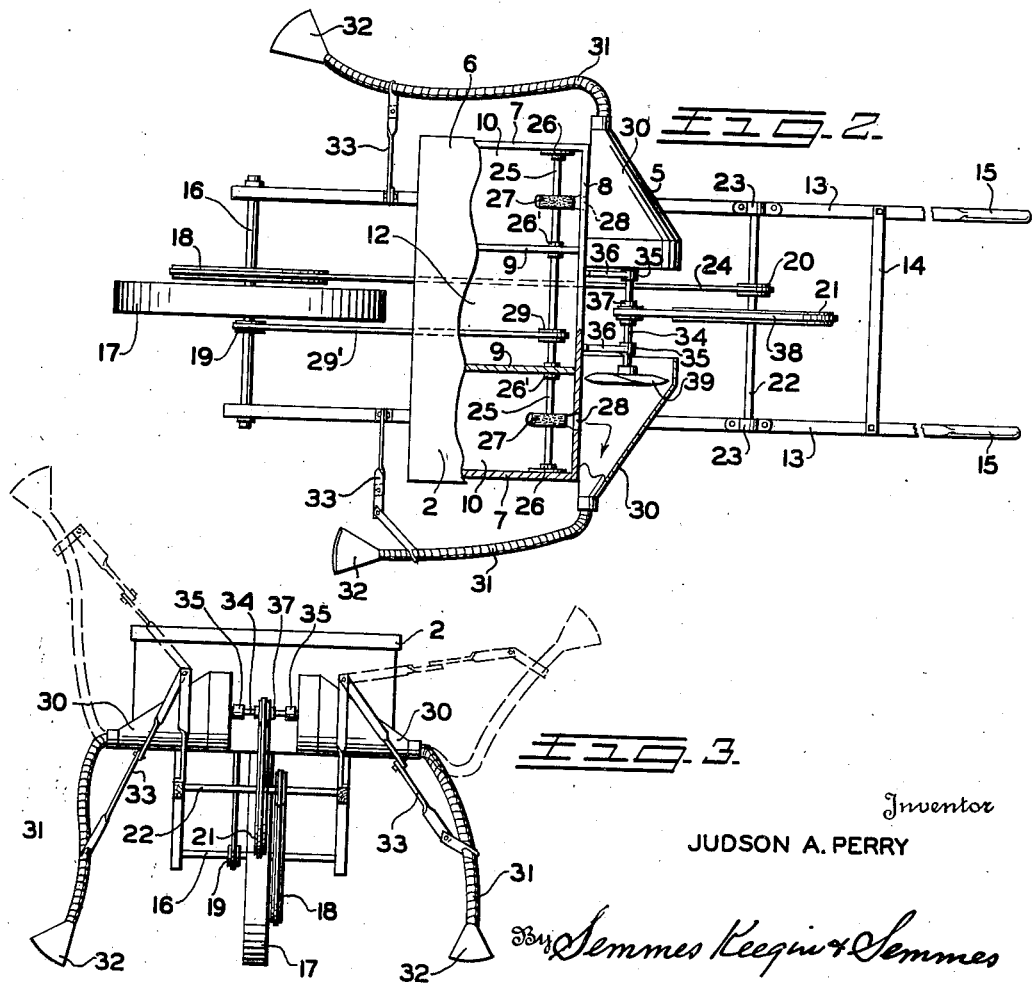
Inventor
JUDSON A. PERRY
By Semmes Keegin & Semmes
Attorneys Patented May 14, 1940

2,200,676

UNITED STATES PATENT OFFICE 2,200,676

DUSTING DEVICE

Judson A. Perry, Norfolk, Va., assignor of fifty one-hundredths to George D. Whitehurst, Norfolk, Va.

Application January 12, 1939, Serial No. 250,657

10 Claims. (Cl. 43—148)

My invention relates to an agricultural implement, and more particularly to a device for dusting growing plants.

One of the objects of my invention is to provide a dusting device which is designed in such a manner that a strong blast of air is provided for distributing the dust.

Another object of my invention is to provide a means by which dust may be positively and regularly fed to the air blast.

A further object of my invention is to provide a device which is efficient in operation, economical in structure, and which is able to deliver an unusually large quantity of dust per unit of time if conditions warrant heavy dusting.

With these and other objects in view, my invention embraces generally the concept of providing a dusting device which is provided with a plurality of easily accessible containers for storing the dust. Means mounted within these containers are also provided for feeding a regulated amount of the material to an air blast which disperses it in a fog-like cloud through conduits. These conduits are provided with means for directing the dust laden air upon the adjacent soil at any desired angle.

In the drawing:

Figure 1 is a side elevational view of my invention, partly broken away.

Figure 2 is a top plan view partly broken away, of the device shown in Figure 1.

Figure 3 is a front view of the device shown in Figure 1 showing diagrammatically the flexible tubes in different positions.

As shown in the drawing, my invention relates to a duster, generally designated by the numeral 1, which comprises a bin 2 which is rigidly mounted on the chassis 3 by any suitable means such as the supporting structure shown at 4. An operating mechanism, generally designated by the numeral 5, is provided to enable the insecticide or other suitable material which is carried in the bin 2 to be evenly distributed upon the soil or growing plants.

The bin 2 is a rectangular box-like structure having a removable top portion 6, end walls 7, and side walls 8. It is also provided with two longitudinally extending partitions 9 which divide the interior of the bin 2 into three compartments. The two outer compartments 10, each of which is formed by one of the opposite end walls 7 and one of the partitions 9, are provided with rearwardly sloping bottom portions 11, as shown in Figure 1. The middle compartment 12 which is formed by the two partitions 9 and the side walls 8 is open at the bottom.

The chassis 3 is of the wheelbarrow type of construction and consists of a pair of parallel handle members 13 which are connected by a brace 14. The outer extremities are provided with handle grips 15. The opposite extremities of the handle members 13 are joined by a shaft 16 which is centrally mounted upon a ground wheel 17. Rigidly mounted on opposite sides of the wheel 17 is a large pulley 18 and a small pulley 19.

A small pulley 20 and a large pulley 21 are also provided. These pulleys are rigidly mounted on a countershaft 22, the ends of which are journalled in bearings 23 carried by the handle members 13. The shaft 22 is positioned between the bin 2 and the brace 14 and the pulley 20 is aligned with the pulley 18 to which it is connected by a belt 24. This arrangement permits the shaft 22 to be driven by the rotation of the shaft 16.

Positioned within the bin 2 is a shaft 25, the extremities of which are mounted in a pair of aligned sockets 26 which are carried by opposite end walls 7. The middle portion of the shaft 25 is journalled in bearings 26' which are carried by the partitions 9.

Mounted on the shaft 25 is a pair of rotary brushes 27 each of which is positioned in one of the receptacles 10. The working surface of each of these brushes is positioned adjacent an aperture 28 extending through the rear wall 8.

A pulley 29 is rigidly attached to the shaft 25 in aligned position with the pulley 19. These pulleys are connected by a belt 29' which operatively connects the shafts 16 and 25.

Mounted on the rear wall 8 in any suitable manner is a pair of fan housings 30. Each of these fan housings 30 is similar in structure and is mounted adjacent one of the apertures 28 and combines with the rear wall 8 to form a funnel-like member, the extremities of which are open.

Attached to the outer and small extremity of each of the housings 30 is a flexible conduit 31 provided with a fishtail spreader nozzle 32. Each of the conduits 31 is mounted on universally jointed brackets 33 which are similarly mounted on opposite handle members 13. This means of supporting the conduits 31 allows the nozzles to be elevated to any height or be pointed in any direction, as indicated in Figure 3.

A fan shaft 34 is also provided which is journalled in bearings 35 which in turn are mounted in a pair of brackets 36. These brackets are mounted on the rear wall 8 between the housings 30. Centrally mounted on the shaft 34, so as to be aligned with the pulley 21, is a pulley 37. A belt 38 connects these pulleys and operatively connects the shafts 22 and 34. The extremities of the shaft 34 extend through the large inner apertures in the funnel-shaped fan housings 30, and a fan 39 is rigidly mounted on each of these extremities.

In operation any suitable dusting material, such as an insecticide or fungicide, is placed in the receptacles 10 which are located on opposite sides of the bin 2 by removing the top portion 6. The nozzles 32 are then placed in any desired position by adjusting the brackets 33, and the duster 1 is placed in operation.

A slow rotation of the wheel 17 and the shaft 16 results in a substantially greater rotation of the shaft 22 due to the step-up pulley arrangement caused by the difference in the respective diameters of the pulleys 18 and 20 which are connected by the belt 24. The driven shaft 22 in turn drives the shaft 34 by means of the belt 38, at a stepped up speed, due to the greater diameter of the driving pulley 21 in comparison with that of the driven pulley 37. By means of these two step-up pulley arrangements, the fans 39 are driven at a high speed and create a substantial blast of air.

The rotation of the wheel 17 and the shaft 16 also causes the shaft 25 to be driven through the belt 29'. As the pulleys 19 and 29 are preferably of substantially the same diameter, the speed of the shaft 25 is approximately that of the shaft 16. This rotation of the shaft 25 in turn drives the brushes 27.

This action of the brushes 27 causes the dust placed within the containers 10 to be forced through the apertures 28 into the fan housings 30 where it encounters the blast from the fans 39 and is forced through the conduits 31 and out of the spreader nozzles 32 in a cloud-like fog. During the operation of this machine, more dust is constantly fed to the revolving brushes 27 by the force of gravity acting upon the material on the inclined bottom portions 11.

From the above description it is believed obvious that I have provided a device for dusting, which although simple in construction and economical to manufacture, is so designed that the dust be dispersed by an air blast. Moreover, the motive power may be supplied by a single man. By the use of a blast of air, the particles of the dusting material which are to be spread may be quickly separated and evenly dispersed over the surrounding vegetation.

Moreover, the arrangement for feeding the dusting material from the bin is so constructed and located adjacent the air blast that this apparatus may be easily adjusted by increasing or retarding the rotation of the wheel 17 so as to place the quantity of the dusting material in front of the air blast which may be desired by the operator. This is an important feature of my invention due to the fact that in actual practice the quantities of material required in different portions even of the same field vary greatly.

While for purposes of illustration I have shown one form of my invention, it is obvious that the manner of mounting the bin and constructing the chassis and the size and location of the pulleys may be varied greatly without departing from the spirit of this invention. Moreover, various mechanical equivalents can be used in connection with the fan and distributing units.

For this reason, it is understood that I wish this invention only to be limited by the prior art and the scope of the appended claims.

I claim:

1. A dusting device which may be manually motivated comprising a bin provided with a pair of storage containers and mounted upon a chassis, a pair of fan housings which are substantially funnel-like in shape mounted on the said bin, a fan mounted in each of the fan housings, said fans being mounted on a single shaft, a driven pulley mounted on the said shaft, a conduit mounted on the funnel-like housings at the end opposite to that of the fans, a second shaft movably mounted on the said chassis upon which is rigidly mounted a pulley of large diameter and a pulley of small diameter, means to connect the large pulley to the driven pulley on the fan shaft, a third shaft which is carried by the chassis and upon which is mounted a wheel that carries the dusting device and a pulley of large diameter, and means to attach the large pulley to the pulley of small diameter on the second mentioned shaft in such a manner that a rotation of the supporting wheel will cause a rapid rotation of the said fans.

2. A dusting device which may be manually motivated comprising a bin provided with a pair of storage containers, each of which is provided with an aperture through one of its side walls, said bin being mounted upon a chassis, a rotatable shaft mounted within said bin, a brush positioned in each of the storage containers and mounted on said shaft adjacent the aperture in the said container, each of said apertures communicating with fan housings which are substantially funnel-like in shape and which are mounted on the said bin, a fan mounted in the upper end of each of the funnel-shaped housings and conduits attached to the remaining apertures at the lower ends of said funnel-shaped housings, said fans being mounted on a single fan shaft, a counter shaft rotatably mounted on the said chassis adjacent the said fan shaft, and a second shaft mounted on the said chassis upon which is mounted a ground wheel which supports the chassis, independent means to operatively connect this last mentioned shaft to the counter shaft and to the shaft mounted within the bin in such a manner that these shafts may be driven by the rotation of the said supporting wheel, and means to operatively connect the said counter shaft to the fan shaft, in order that the fan shaft will also be driven by the rotation of the said ground wheel.

3. A dusting device which may be manually operated comprising a bin provided with a pair of storage containers, each of which is provided with an aperture through one of its side walls and mounted upon a chassis, a rotatable shaft mounted within said bin and provided with a driven pulley, a brush positioned in each of the storage containers and mounted on said shaft adjacent the aperture in the said container, each of said apertures communicating with fan housings which are substantially funnel-like in shape and which are mounted on a side of the said bin, a fan mounted in the upper end of each of said funnel-shaped housings and conduits attached to the remaining apertures at the lower ends of said funnel-shaped housings, said fans being mounted on a single driven shaft upon which is mounted a driven pulley, a shaft rotatably mounted upon the said chassis and provided with a driving pulley of large diameter and a driven pulley of small diameter, means to connect said driving pulley to the driven pulley mounted on the fan shaft, a second driving shaft mounted on the said chassis upon which is mounted a wheel which supports the chassis, and a pair of driving pulleys, one of large and one of small diameter, said driving pulley of large diameter being connected with the driven pulley on the second mentioned shaft and said driving pulley of small diameter being operatively connected to the driven pulley mounted on the shaft which is positioned within the said bin.

4. A manually operated dusting device comprising, a chassis including a pair of longitudinal members in spaced apart relation, a drive shaft carried by said members and having a ground engaging wheel fixedly mounted thereon to pivotally support the said chassis, said drive shaft further having two pulley wheels fixedly mounted thereon, one of said pulley wheels having a larger diameter than the other, a driven shaft carried by said longitudinal members spaced from said drive shaft, said driven shaft having a large and small pulley wheel mounted thereon, means operatively connecting the large pulley wheel mounted on said drive shaft to the small pulley wheel mounted on said driven shaft, a dust receptacle mounted on said longitudinal members intermediate said drive and driven shafts, said dust receptacle supporting a rotatable shaft having a pulley wheel fixedly mounted thereon, means operatively connecting the small pulley wheel mounted on said drive shaft to the pulley wheel mounted on the shaft supported in the said dust receptacle, brush means mounted on said receptacle supported shaft, a blower communicating with said dust receptacle, and means operatively connecting said large pulley wheel mounted on said driven shaft to said blower.

5. A manually operated dusting device comprising, a chassis including a pair of longitudinal members in spaced apart relation, a drive shaft carried by said members and having a ground engaging wheel fixedly mounted thereon to pivotally support the said chassis, said drive shaft further having two pulley wheels fixedly mounted thereon, one of said pulley wheels having a larger diameter than the other, a driven shaft carried by said longitudinal members spaced from said drive shaft, said driven shaft having a large and small pulley wheel mounted thereon, means operatively connecting the large pulley wheel mounted on said drive shaft to the small pulley wheel mounted on said driven shaft, a dust receptacle mounted on said longitudinal members intermediate said drive and driven shafts, said dust receptacle supporting a rotatable shaft having a pulley wheel fixedly mounted thereon, means operatively connecting the small pulley wheel mounted on said drive shaft to the pulley wheel mounted on the shaft supported in the said dust receptacle, brush means mounted on said receptacle supported shaft, a blower communicating with said dust receptacle, said blower including a rotatable shaft having a fan mounted on each end portion and a pulley wheel mounted intermediate the ends thereof, and means operatively connecting said large pulley wheel mounted on said driven shaft to the pulley wheel mounted on said blower shaft.

6. A manually operated dusting device comprising, a chassis including a pair of longitudinal members in spaced apart relation, a drive shaft carried by said members and having a ground engaging wheel fixedly mounted thereon to pivotally support the said chassis, said drive shaft further having two pulley wheels fixedly mounted thereon, one of said pulley wheels having a larger diameter than the other, a driven shaft carried by said longitudinal members spaced from said drive shaft, said driven shaft having a large and small pulley wheel mounted thereon, means operatively connecting the large pulley wheel mounted on said drive shaft to the small pulley wheel mounted on said driven shaft, a dust receptacle mounted on said longitudinal members intermediate said drive and driven shafts, said dust receptacle supporting a rotatable shaft having a pulley wheel fixedly mounted thereon, means operatively connecting the small pulley wheel mounted on said drive shaft to the pulley wheel mounted on the shaft supported in the said dust receptacle, brush means mounted on said receptacle supported shaft, a blower mounted on and communicating with said dust receptacle; said blower including a rotatable shaft having a fan mounted on the ends thereof, a pair of funnel-shaped fan housings each fitting over one of said fans and being mounted on said dust receptacle, a pulley wheel mounted on said blower shaft intermediate the said fan housings; and means operatively connecting said large pulley wheel mounted on said driven shaft to the pulley wheel mounted on said blower shaft.

7. A dusting device which may be manually motivated comprising a bin provided with a plurality of storage containers, each of which is provided with an aperture through one of its side walls, said bin being mounted upon a chassis, a rotatable shaft mounted within said bin, a brush positioned in each of the storage containers and mounted on said shaft adjacent the aperture in the said container, each of said apertures communicating with one of a plurality of fan housings which are mounted on the said bin, a fan mounted in the upper end of each of the fan housings, said fans being mounted on a single fan shaft, conduits attached to the lower ends of the fan housings, a counter-shaft rotatably mounted on the said chassis adjacent the said fan shaft, and a second shaft mounted on the said chassis upon which is mounted a ground wheel which supports the chassis, independent means to operatively connect this last mentioned shaft to the counter-shaft and to the shaft mounted within the bin in such a manner that these shafts may be driven by the rotation of the said supporting wheel, and means to operatively connect the said counter-shaft to the fan shaft in order that the fan shaft will also be driven by the rotation of the said ground wheel.

8. A manually operated dusting device comprising, a chassis including a pair of longitudinal members in spaced relation, a drive shaft carried by said members, a ground engaging wheel fixedly mounted on said drive shaft to pivotally support the said chassis, a driven shaft carried by said longitudinal members and spaced from said drive shaft, means driven by the drive shaft to operatively connect the said shafts, a bin mounted on said longitudinally extending members at a point intermediate their extremities, said bin consisting of a plurality of storage containers each of which is provided with an aperture, a brush positioned in each storage container and mounted on a shaft adjacent the aperture in the said container, said brushes being driven by the drive shaft, each of said apertures communicating with a blower which is mounted adjacent the bin, and means connecting the said blowers to the said driven shaft in order that the blowers will be operated by the rotation of the said ground wheel.

9. A manually operated dusting device comprising, a chassis including a pair of longitudinal members in spaced relation, a drive shaft carried by said members, a ground engaging wheel fixedly mounted on said drive shaft to pivotally support the said chassis, a driven shaft carried by said longitudinal members and spaced from said drive shaft, means driven by the drive shaft to operatively connect the said shafts, a bin mounted on said longitudinally extending members at a point intermediate their extremities, said bin consisting of a plurality of storage containers each of which is provided with an aperture, a shaft mounted on the bin and extending through the storage containers, said shaft being driven by the said drive shaft, a brush positioned in each storage container and mounted on said shaft adjacent the aperture in the said container, each of said apertures communicating with one of a plurality of blowers which are mounted adjacent the bin, and means connecting the said blowers to the said driven shaft in order that the blowers will be operated by the rotation of the said ground wheel.

10. A manually operated dusting device comprising, a chassis including a pair of longitudinal members in spaced relation, a drive shaft carried by said members, a ground engaging wheel fixedly mounted on said drive shaft to pivotally support the said chassis, a driven shaft carried by said longitudinal members and spaced from said drive shaft, means driven by the drive shaft to operatively connect the said shafts, a bin mounted on said longitudinally extending members at a point intermediate their extremities, said bin consisting of a plurality of storage containers each of which is provided with an aperture, a shaft mounted on the bin and extending through the storage containers, said shaft being driven by the said drive shaft, a brush positioned in each storage container and mounted on said shaft adjacent the aperture in the said container, each of said apertures communicating with one of a plurality of fan housings which are mounted adjacent the bin, a fan mounted in each of the fan housings, said fans being mounted on a single fan shaft, an opening in each of the fan housings, a conduit attached to each of the openings, and means connecting the fan shaft to the said driven shaft in order that the fan shaft will be driven by the rotation of the said ground wheel.

JUDSON A. PERRY.